Figure 8:
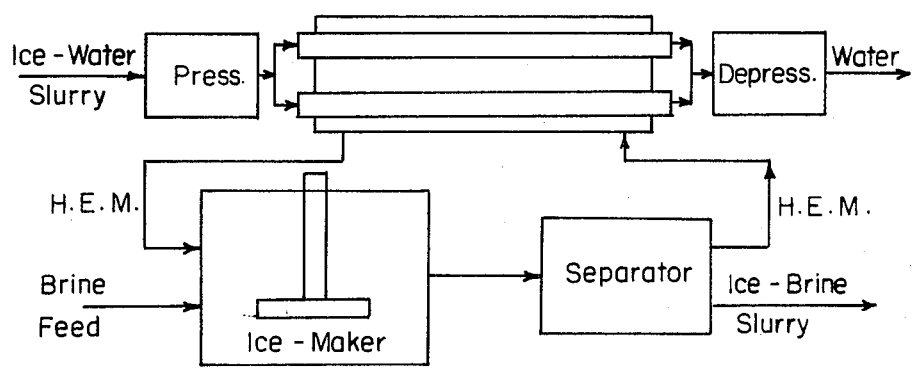
Figure 8:
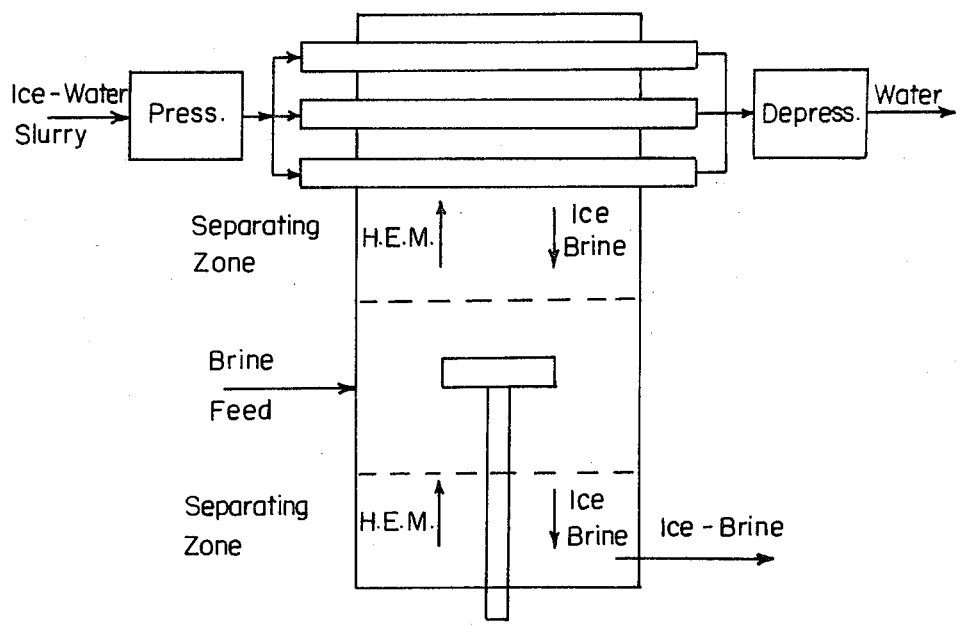

United States Patent
Cheng et al.

[15] 3,690,116
[45] Sept. 12, 1972

[54] FREEZING PROCESS WITH A LOW PRESSURE ICE-MAKING AND A HIGH PRESSURE ICE-MELTING OPERATION

[72] Inventors: Chen-Yen Cheng, 920 Moro St., Apt. 2, Manhattan, Kans. 66502; Sing-Wang Cheng, No. 83, Chang-an East Rd., Sect. 1, Taipei, China /Taiwan

[22] Filed: Dec. 6, 1967

[21] Appl. No.: 688,404

[52] U.S. Cl. .................................................. 62/58
[51] Int. Cl. ............................................. B01d 9/04
[58] Field of Search .......................................... 62/58

[56] References Cited

UNITED STATES PATENTS

| | | | |
|---|---|---|---|
| 2,921,444 | 1/1960 | Bump et al. ..................... | 62/58 |
| 3,049,888 | 8/1962 | Bosworth ....................... | 62/58 |
| 3,049,889 | 8/1962 | Carfagno ........................ | 62/58 |
| 3,255,605 | 6/1966 | Johnson et al. ................. | 62/58 |
| 3,398,547 | 8/1968 | Sliepcevich et al. ............. | 62/58 |
| 3,399,538 | 9/1968 | Sliepcevich et al. ............. | 210/60 |
| 3,425,235 | 2/1969 | Cox ............................. | 62/58 |
| 3,342,039 | 9/1967 | Bridge et al. .................. | 62/58 |
| 3,410,339 | 11/1968 | Wiegandt ....................... | 62/58 |
| 3,443,393 | 5/1969 | Goldberg ....................... | 62/58 |

*Primary Examiner*—Norman Yudkoff
*Assistant Examiner*—R. T. Foster

[57] ABSTRACT

The present invention relates to freezing processes, each one of which consists of a low pressure ice-making operation and a high pressure ice-melting operation. In the low pressure freezing step, water is flash vaporized from an aqueous solution under a vacuum to simultaneously produce ice crystals. The low pressure water vapor at pressures below triple point is either desublimed to form solid ice or absorbed into an aqueous solution at a temperature lower than 0° C. The separated ice crystals are melted under a high pressure to lower its melting point sufficiently so that the melting temperature becomes lower than the temperature at which the low pressure water vapor is either desublimed or absorbed in an aqueous solution. The low pressure water vapor and the separated ice crystals are in indirect heat exchange relation during these operations so that the heat released in the desublimation or absorption operation is utilized in the melting of ice crystals. The low pressure water vapor may also be brought into direct contact with a heat exchange medium which is at least partly in solid state to thereby simultaneously convert the water vapor into solid ice and melt the heat exchange medium.

6 Claims, 12 Drawing Figures

4-a. Desublimation by mechanical scraping.

4-b. Desublimation onto a falling H.E.M. liquid.

4-c. Absorption into an aqueous solution.

4-d. Desublimation onto a falling H.E.M. slurry.

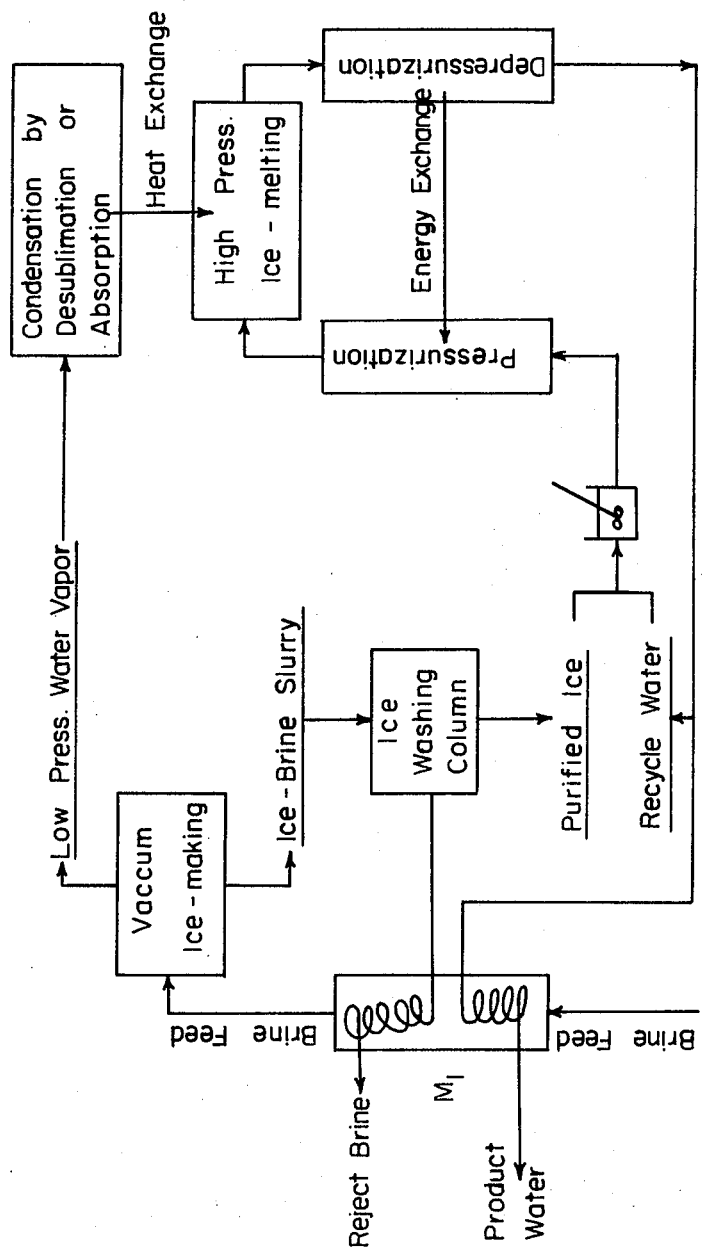
Fig. 1. Flow-sheet of a freezing process consisting of a vaccum ice-making operation and a high pressure simple ice-melting operation.
Inventors
Chen-yen Cheng
Sing-Wang Cheng

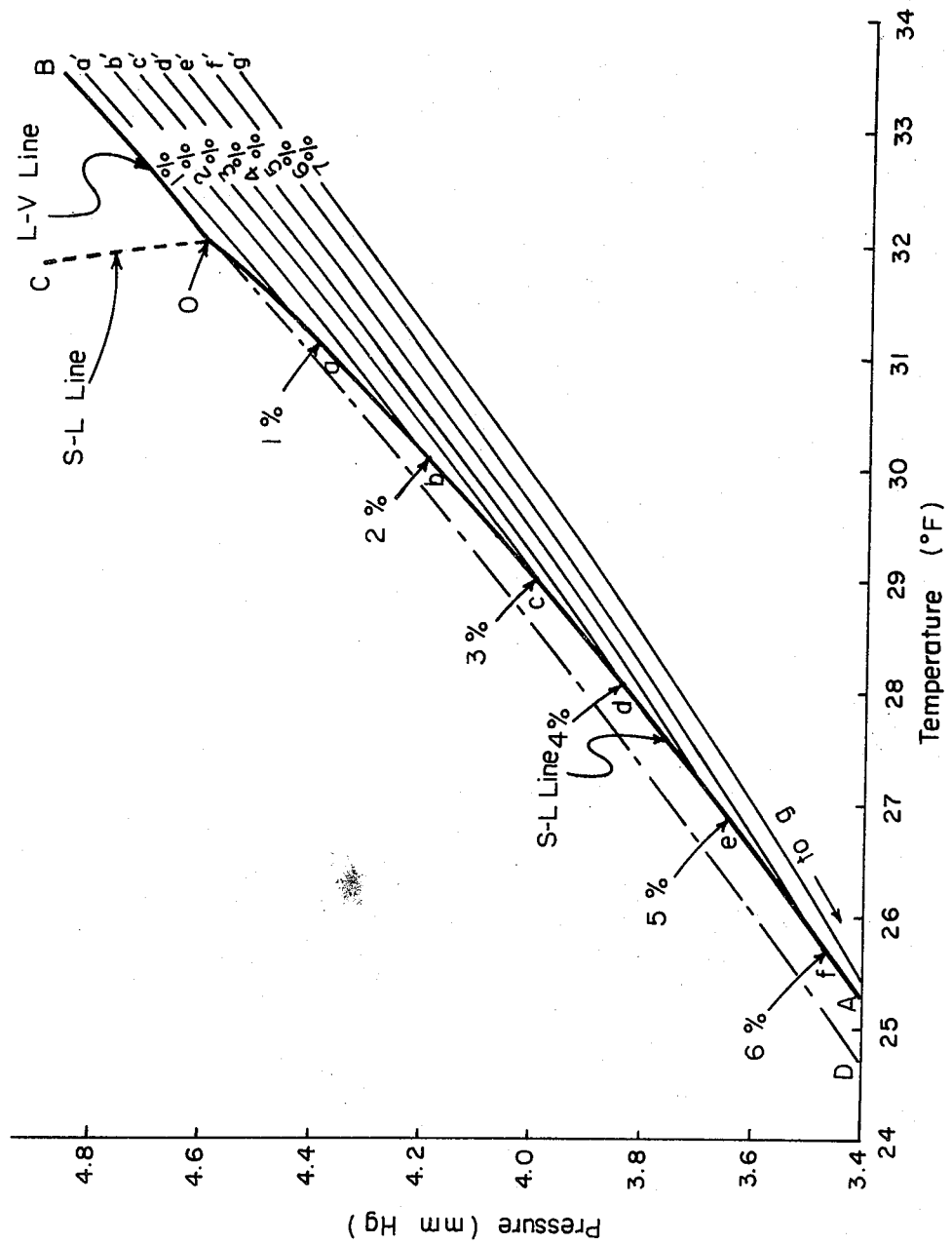
Fig. 2. Phase diagram for pure water and aqueous NaCl solution.

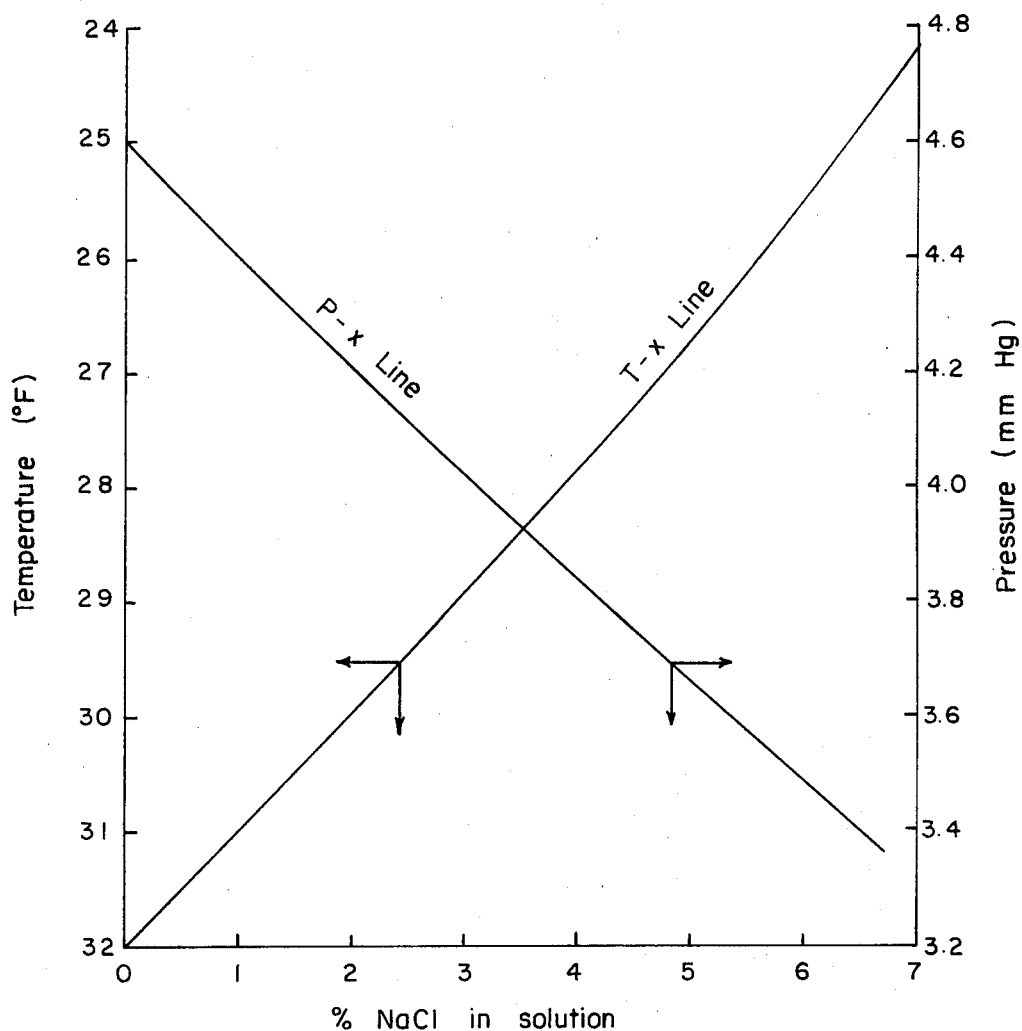
Fig. 3. Three phase (vapor-ice-solution) equilibrium — equibrium temperature and vapor pressure vs. salt concentration in the aqueous solution.

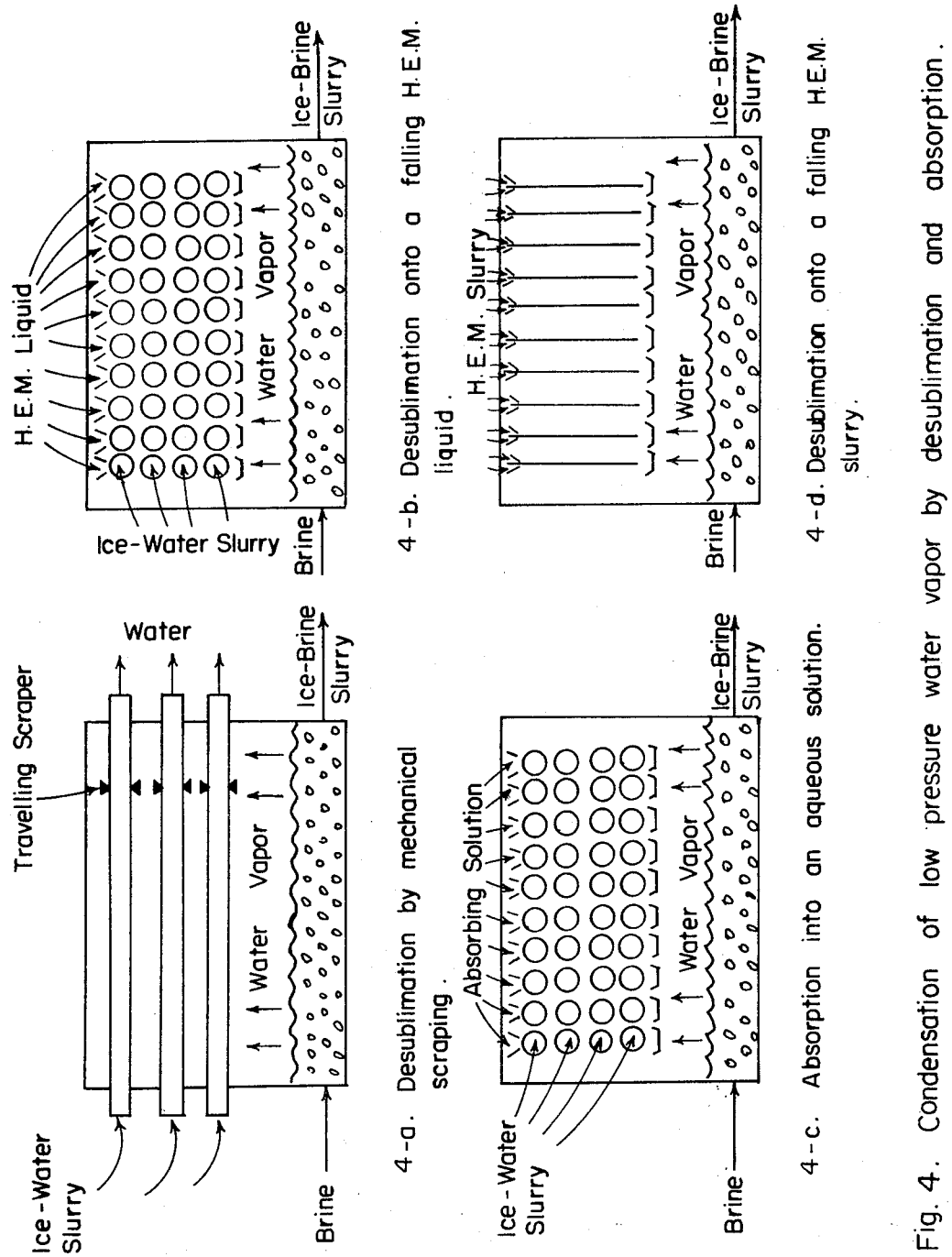
Fig. 4. Condensation of low pressure water vapor by desublimation and absorption.

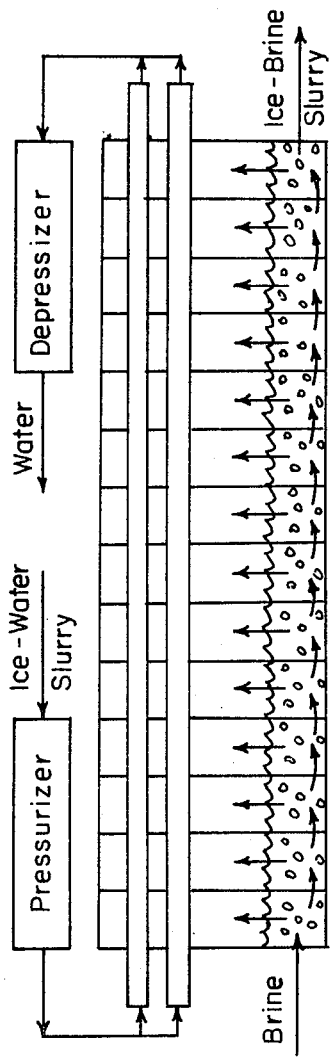
Fig. 5a. Multistage freezing process.
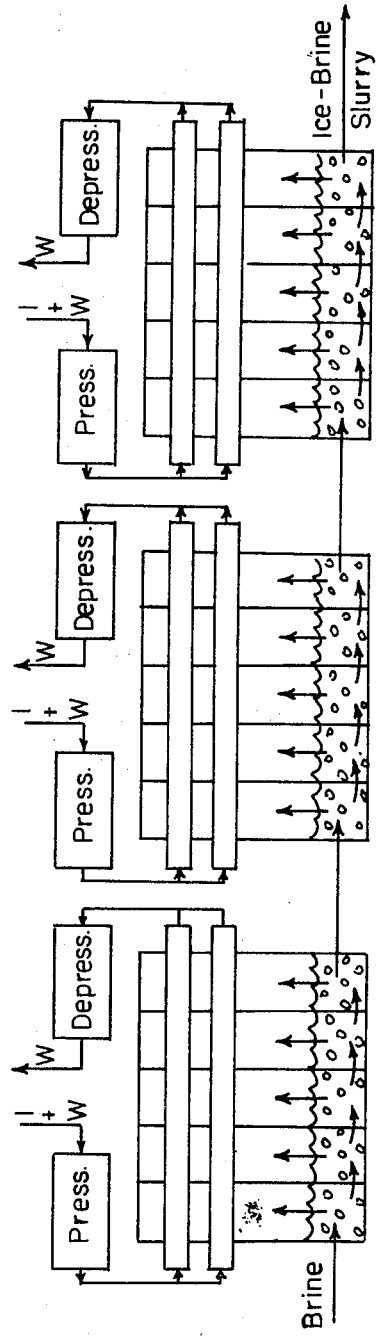
Fig. 5b. Multieffect multistage freezing process.

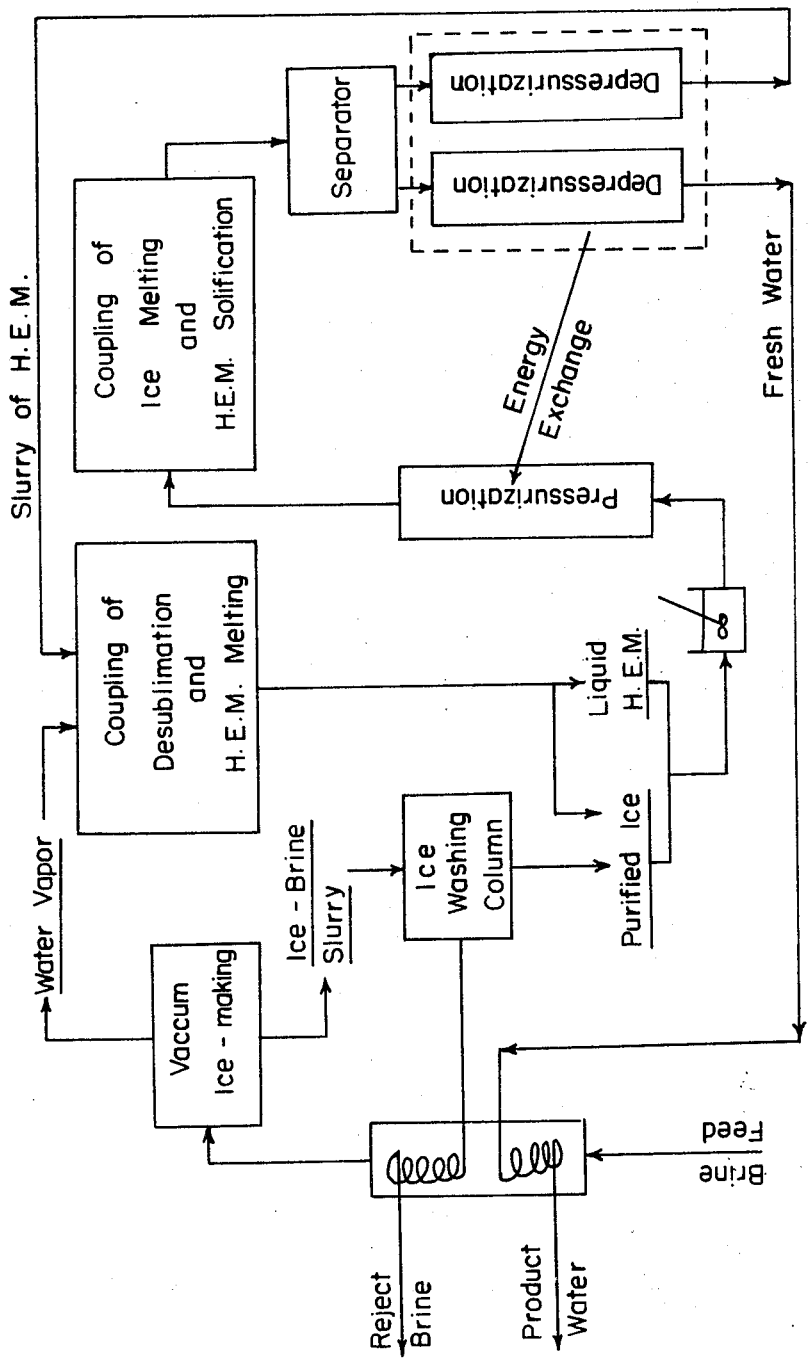
Fig. 6. Flow-sheet of a freezing process consisting of a vaccum ice-making operation and a high pressure coupled ice-melting operation.

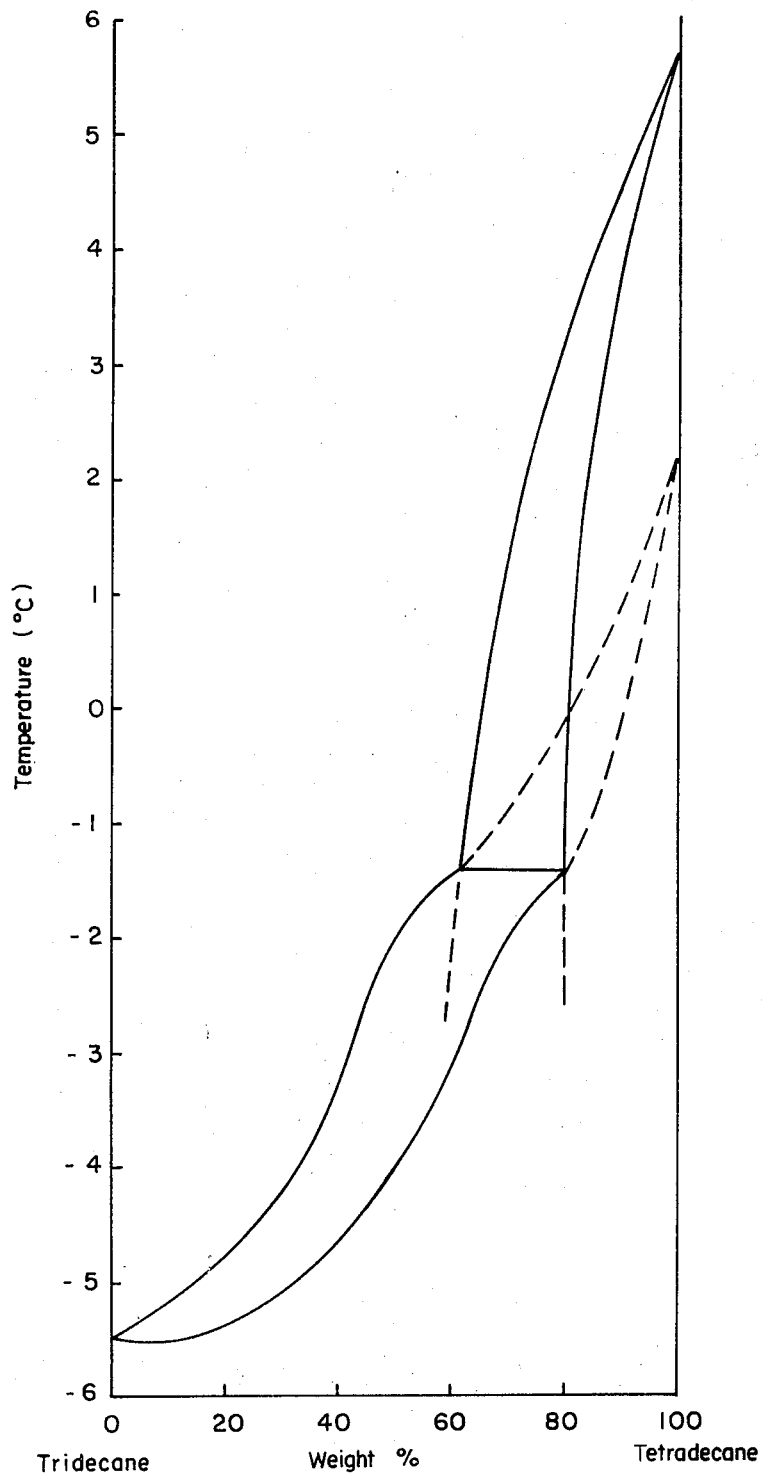
Fig. 7. Phase diagram for tridecane-tetradecane system.

Fig. 8. A freezing process consisting of a direct contact ice-makin operation and a simple ice-making operation.

Inventors
Chen-yu Cheng
Sing-Wang Cheng

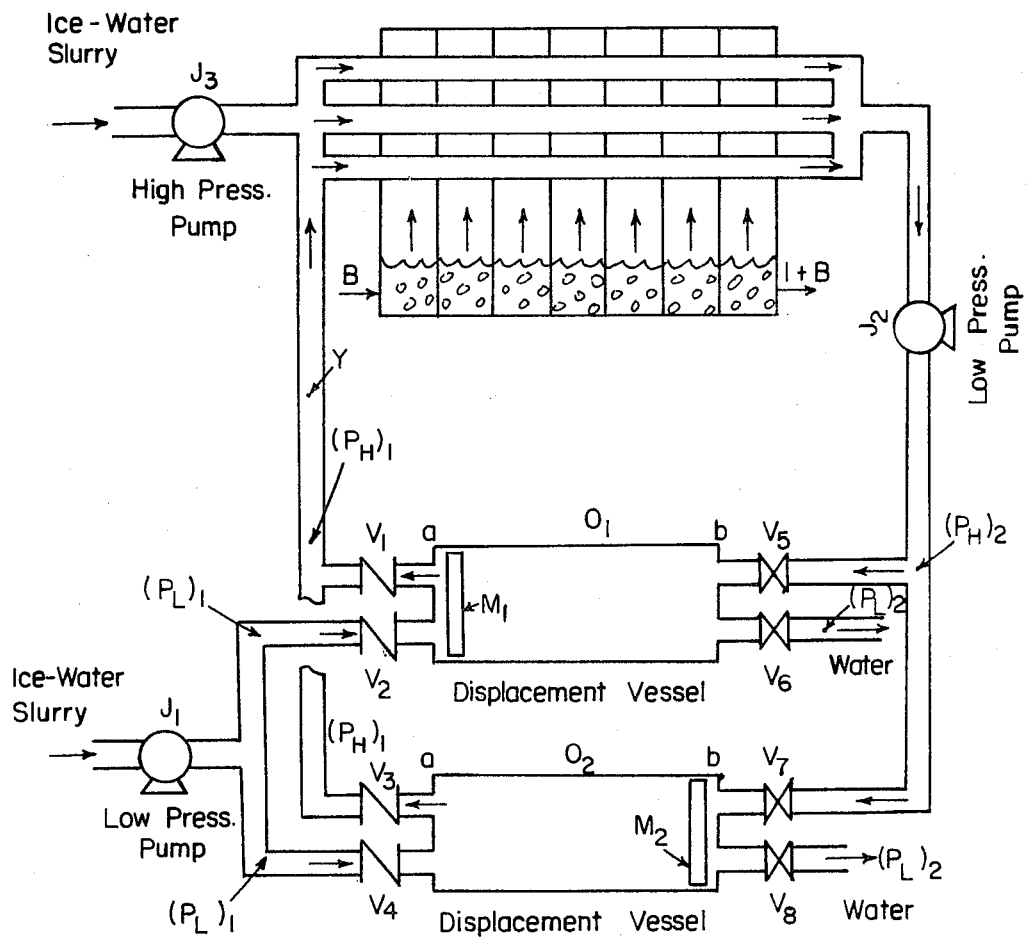
Fig. 9. Energy exchange between pressurization and depressurization operations by a flow-work exchanger.

FREEZING PROCESS WITH A LOW PRESSURE ICE-MAKING AND A HIGH PRESSURE ICE-MELTING OPERATION

The present invention relates to freezing processes, each one of which consists of a low pressure ice-making operation and a high pressure ice-melting operation. In these processes, heat reuse, utilizing the heat liberated in the ice-making operation to melt ice in the ice-melting operation, is achieved by taking advantage of the abnormal melting-point lowering of water due to the applied pressure. A low pressure ice-making operation may either be a vaccum freezing operation or a direct contact cooling operation. In a vaccum freezing operation, water is flash vaporized from an aqueous solution under a vacuum so that ice freezes out of the solution at the same time. In a direct contact cooling operation, an aqueous solution is cooled by direct contact heat exchange with a heat exchange medium which is immiscible with the aqueous solution. A high pressure ice-melting operation may either be a simple ice-melting by indirect contact heating or be a coupled process in which a heat exchange medium is solidified at the same time ice is melted to maintain heat balance. The former is refered to as a simple ice-melting operation and the latter is refered to as a coupled ice-melting operation. When a coupled ice-melting operation is used in the high pressure operation, the low pressure ice-making operation should also be a coupled process by which the solidified heat exchange medium is melted at the same time ice is formed to regenerate the heat exchange medium.

When a vaccum flash operation is used in the ice-making operation, the low pressure water vapor so obtained is condensed (becomes solid or liquid) either by desublimation or by absorption into an aqueous solution. The water vapor is not compressed in the present processes as is done in the conventional vacuum freezing processes. The heat liberated in this condensation operation is utilized in the melting of ice. There are several possible modifications in the process depending on how the water vapor is condensed and how the heat of condensation (desublimation or absorption) is used in the ice-melting operation. When a direct contact cooling is used in the ice-making operation, the heat picked up by the heat exchange medium is utilized in the high pressure ice-melting operation.

The primary objective of this invention is to provide freezing processes by which fresh water can be separated from an aqueous solution such as sea water, brackish water, cane juice and other industrial process fluids at a low power consumption and at a low plant cost.

A freezing process, generally, consists of three steps: an ice-making operation in which the aqueous solution feed is partially frozen to produce ice crystals, an ice-washing operation by which the ice crystals formed in the first step are washed free of adhering mother liquor and an ice-melting operation by which the purified ice is melted to yield fresh water. It should be noticed that heat of crystallization of ice has to be removed in the ice making operation and heat of melting of ice has to be supplied in the ice-melting operation. The essential requirement of any successful freezing process to produce fresh water at a low cost is to utilize the heat removed in the ice-making operation to supply the heat required in the ice-melting operation. This heat reuse can be attained in various ways and a freezing process can be characterized by the way heat reuse is attained in the process.

A freezing process of the present invention combines a low pressure ice-making operation, such as a vaccum freezing operation or a direct contact freezing operation, with a high pressure ice-melting operation, such as a simple ice-melting operation or a coupled ice-melting operation. Heat reuse is achieved by taking advantage of the abnormal melting-point lowering of water (ice) due to the applied pressure. Before detail descriptions of the freezing processes of the present invention are made, the conventional freezing processes are briefly reviewed in the following sections.

The conventional freezing processes can be classified into three categories. A freezing process belonging to the first category will be refered to as a freezing process with vapor compression. It attains the heat reuse by the following steps:

1. Heat of crystallization in the ice-making operation is removed by flash vaporization of a liquid.
2. The vapor formed in the first step is compressed to increase its condensing temperature.
3. The compressed vapor is directly contacted with purified ice, so that ice is melted as the vapor is condensed. The vaccum-freezing vapor-compression process, which is under development by Colt Industries, and the so-called secondary refrigerant processes under development by Struther Co., Carrier Corp. and Blaw-Knox Co. belong to this category. In the vaccum-freezing vapor-compression process, water is flash vaporized from the aqueous solution and in the secondary refrigerant process, a refrigerant such as n-butane, isobutane and octaflurocyclobutane is flash evaporated in the first step. These vapors are condensed in the third step. The main drawbacks of the processes belong to this category are: (i) high power consumption and (ii) high plant cost.

A freezing process belonging to the second category will be refered to as a freezing process with vapor absorption and desorption. It attains the heat reuse by the following steps:

1. Heat of crystallization in the ice-making operation is removed by flash vaporization of water from an aqueous solution under vaccum.
2. The low pressure water vapor is absorbed into a lithium bromide solution and the heat of absorption is removed by a recycling water stream through a heat transfer surface.
3. The recycling water stream is used to melt ice crystals.
4. The diluted absorbent (LiBr solution) is reconcentrated by distillation. Two recycling streams are used in this process. An absorbent, LiBr solution is recycled between step 2 and step 4 to absorb water vapor in the former step and desorb (vaporize) water in the latter step. A water stream is recycled between step 2 and step 3 to remove heat of absorption in step 2 and supply heat of melting in step 3. This process was studied by Carrier Corp. and the study has since been discontinued. The absorbent is a rather concentrated LiBr solution, because the absorption temperature is high 0 32° to 34°F. It will be shown that in one process of the present invention, the low pressure water vapor obtained in a vaccum freezing operation is absorbed into an aqueous solution of a low concentration by conducting the absorption operation at a low temperature. The utilization of the heat of absorption for melting of ice is made possible by lowering the melting point of ice to a temperature even lower than the absorption temperature by applying pressure to the ice.

A freezing process belonging to the third catagory attains the heat reuse by the following steps. 1. Heat of crystallization in the ice-making operation is removed by melting a heat exchange medium of a proper melting point (or melting range), by direct contact heat exchange between the two streams. This operation will be refered to as a coupled ice-making operation.

2. The heat exchange medium melted in the first operation is contacted with purified ice and the mixture is pressurized to invert the order of melting points of water and the heat exchange medium.

3. In the high pressure ice melter, the ice is melted to become fresh water and the heat exchange medium is partially solidified to form a slurry. The slurry is recycled to the first operation. The operation will be refered to as a coupled ice-melting operation. This process was invented by the present inventors and a letter patent will be issued to them shortly (patent filling No. 346,112, filed Feb. 20, 1964) now U.S. Pat. No. 3,353,083. This process will be called a melting point inversion process with a coupled ice-making operation and a coupled ice-melting operations.

It has been described that a freezing process of the present invention consists of a low pressure ice-making operation and a high pressure ice-melting operation and is so arranged to utilize the heat removed in the ice-making operation to supply the heat required in the ice-melting operation. A low pressure ice-making operation may either be a vaccum freezing operation or a direct contact cooling operation. In a vaccum freezing operation, the low pressure water obtained in the ice-making operation may be condensed by one of the following four ways: desublimation (condensed into solid state) on a heat transfer surface, desublimation onto a liquid heat transfer medium, coupled desublimation onto a slurry of heat exchange medium so that the heat exchange medium is melted as the water vapor is desublimed, and absorption into an aqueous solution. A high pressure ice-melting operation may either be a simple ice-melting by indirect contact heating or a coupled ice-melting operation in which a heat exchange medium is solidified to supply the heat required in the ice-melting operation.

Therefore, the processes of this invention can be classified according to the ice-making means, vapor condensation means and ice-melting means. Therefore, these processes are classified into the following three categories for the convenience of discussion.

I. Ice-making by a vaccum flash evaporation and high pressure simple ice-melting by an indirect contact heat transfer.

II. Ice-making by a vaccum flash evaporation and high pressure coupled ice-melting by a direct contact heat transfer.

III. Low pressure ice-making by a direct contact heat transfer and high pressure simple ice-melting by an indirect contact heat transfer.

These processes are closely related and are based on the same principle: viz.attaining the desired heat reuse by pressurizing ice. The processes are explained in detail under the above categories in the following sections.

I. ICE-MAKING BY A VACCUM FLASH EVAPORATION AND HIGH PRESSURE SIMPLE ICE-MELTING BY AN INDIRECT CONTACT HEAT TRANSFER

FIG. 1 shows a flow sheet of a freezing process consisting of an ice-making operation by vaccum flash evaporation and a high pressure simple ice-melting operation by an indirect contact heat transfer. Refering to the FIG., a brine feed (say NaCl solution) is heat exchanged with product water stream and reject brine stream to be described by a heat exchanger $M_1$ and enter an ice-maker. The ice-maker is maintained at a pressure lower than the equilibrium pressure of the three phases (ice-water vapor-aqueous solution) equilibrium condition corresponding to the prevailing brine concentration in the ice-maker. Water is flash evaporated from the aqueous solution at the same time ice freezes out of the solution. The ice-brine slurry so obtained is sent to an ice-washing column or any other separating devices to free the ice crystals from the adhering mother liquor. The mother liquor so obtained is heat exchanged with the brine feed by $M_1$ before being discharged as a reject brine. The low pressure water vapor so obtained is condensed either by desublimation or by absorption into an aqueous solution. Desublimation is here defined to mean condensation of vapor into solid. It should be mentioned here that, since the vapor pressure of water in the ice-maker is lower than the vapor pressure at the triple point of water, and since we do not compress the low pressure water vapor, the water vapor can not be condensed into pure liquid state. This is one of the characteristic features of the present invention which distinguishes it from the conventional freezing processes. The purified ice is reslurried either by water or an organic liquid and pressurized to such a pressure as to reduce the melting point of ice to a temperature lower than the condensation temperature of the low pressure water vapor described above. This provides the temperature difference required for heat transfer and, thus, the heat of condensation can be utilized in the melting of ice. The ice-water slurry or the ice-organic liquid slurry is pressurized and is confined within a metal wall during ice-melting operation and the metal wall serves the purpose of heat transfer area. Ice is melted in the high pressure melter by indirect contact heating utilizing the heat of condensation of the water vapor and the resulting stream is depressurized. Part of the water so obtained is recycled to be mixed with the purified ice to give fluidity to the mixture for better handling. The remaining water is heat exchanged with the brine feed by $M_1$ before being discharged. An immiscible organic liquid may serve the purpose of slurrifying the ice. Energy can be recovered in the depressurization operation and the energy so recovered may be used to pressurize additional slurry. This energy exchange can be accomplished efficiently by the so-called flow-work exchanger which was invented by the present inventors and has been published in the A.I.Ch.E. Journal (American Institute of Chemical Engineers Journal), p 438, Vol 13, No. 3 (1967). In order to balance all of the inefficiencies of the process plus the reversible work for separation, a refrigeration step would, by necessity, have to remove a certain amount of heat from the process. This may be conveniently done by condensing some of the low pressure water vapor by the refrigerating unit.

It is seen above that the process consists of the following main operations:

a. ice-making operation by vaccum flash evaporation.
b. ice-washing operation.
c. condensation of the low pressure water vapor.
d. high pressure ice-melting operation.
e. heat exchange relation between vapor condensation operation and ice-melting operation.
f. energy exchange relation between pressurization and depressurizing operations.

These operations are separately described as follows:

A. ICE-MAKING OPERATION BY VACCUM FLASH EVAPORATION

The principle and the practice of the ice-making operation by vaccum flash evaporation have been well studied and been published. A very detailed description has been made by A.E. Snyder in the following book.

"Principles of Desalination", edited by K. S. Spiegler, Academic Press (1966).

In the following sections, the general principle is illustrated in detail for the benefit of later reference.

FIG. 2 shows a phase diagram for pure water and aqueous NaCl solution. The triple point for water is represented by point O. Lines OA, OB and OC respectively show the solid-vapor equilibrium line, the liquid-vapor equilibrium line and the solid-liquid equilibrium line. The line OC is dotted to remind that the line is not properly scaled. The slope of the OC-line is negative and the melting point of ice is lowered by 1°C with an increase of about 100 atm.in the applied pressure. Line OD shows the metastable liquid-vapor equilibrium below the triple point temperature.

The principle related to vapor condensation is outlined as follows:

1. At a temperature lower than the triple point temperature (32°F), a water vapor having a vapor pressure higher than the saturation vapor pressure (as represented by OA-line) condenses into solid water (ice).
2. At a temperature higher than the triple point temperature, a water vapor having a vapor pressure higher than the saturation vapor pressure (as represented by OB-line) condenses into liquid water.
3. When a water vapor at a pressure lower than the triple point pressure (4.6 mmHg) is cooled to a temperature lower than the saturation temperature (as sepresented by OA-line), it condenses into solid water (ice).
4. Where a water vapor at a pressure higher than the triple point pressure (4.6 mm Hg) is cooled to a temperature lower than the saturation temperature (as represented by OB-line), it condenses into liquid water.

The vapor pressure of an aqueous solution containing a non-volatile solution at a temperature is always lower than that of pure water of the same temperature due to the so-called "vapor-pressure depression principle." Lines $aa'$, $bb'$, $cc'$, $dd'$, $ee'$, $ff'$ and $gg'$ in FIG. 2 respectively represent the vapor pressure of an aqueous NaCl solution at the concentrations of 1 percent, 2 percent, 3 percent, 4 percent, 5 percent, 6 percent and 7 percent at various temperatures. When an aqueous solution is flash evaporated at a very low pressure, an equilibrium condition consisting of three phases, ice, water vapor and aqueous solution, is attained. The degree of freedom of the system is 1 as can be shown by the application of Gibb's phase rule:

$$F = C + 2 - P$$
$$= 2 + 2 - 3 = 1,$$

where $F$, $C$ and $P$ respectively represent degree of freedom, number of components and number of phases. Line OA in FIG. 2 also shows this univariant Pressure-Temperature-Composition relation for the three phase equilibrium for NaCl-water system with composition of the equilibrium solution indicated as a parameter. Therefore, given the composition of a prevailing solution, we can find the equilibrium temperature and the saturation vapor pressure. The P-$x$ relation and the T-$x$ relation for this three-phase equilibrium can be read from FIG. 2 and the relations are shown in FIG. 3. For example, when the composition of the prevailing solution is 3 percent, the equilibrium temperature is 29.1°F and the saturation vapor pressure is 4.0 mm Hg. Water vapor evaporated from an aqueous solution under three phase (water vapor-ice-solution) equilibrium has a vapor pressure which is lower than the triple point pressure. Therefore the vapor can not be condensed into pure liquid water, unless the vapor is compressed so that the vapor pressure exceeds the triple point pressure. This condensation problem is important to this invention and we will return to its discussion shortly (under the heading (c), condensation of the low pressure water vapor).

In an actual operation, the pressure in the ice-maker is maintained at a pressure which is 0.15–0.3 mm Hg lower than the equilibrium pressure corresponding to the prevailing solution composition, and the prevailing temperature. This pressure differential is required to obtain evaporation and freezing at practical rates.

As water evaporates and ice crystalizes out of a solution, its concentration increases and both the equilibrium temperature and pressure decrease. In a one stage, back-mixed type operation, the composition of the solution prevailing in the ice-maker is close to the composition at the exit condition. Therefore, water has to be evaporated and ice has to be frozen out from the most concentrated solution. This is a thermodynamically inefficient operation. In this situation it is advantageous to adopt multistage operation, because it improves the thermodynamic efficiency. The processes of the present invention is particularly adaptable to such a mutistage operation. This is also one of the characteristic features of the present invention. We will describe such multistage operation later and show how we can obtain higher thermodynamic efficiency and reduce power consumption in separating water from an aqueous solution later. In contrast to this situation, most of the conventional freezing processes are carried out in one-stage back-mixed type ice-maker. This is because in the conventional processes, heat reuse is obtained by vapor compression. For such a process a multistage operation can be accomplished only with great increase in plant cost and with greatly increased difficulty in plant operation. It should be noted that for the processes of the present invention, multistage operation can be accomplished with either a saving or a very little increase in plant cost and with little increase in the operational difficulty.

B. ICE-WASHING OPERATION

Ice-brine separation is an operation common to all freezing processes. Ice crystals must be washed with fresh water to remove any brine carried within the interstices of the crystals. It has been found most successful to use a vertical wash-separation column in which ice-brine separation is accomplished by countercunent washing with fresh water in a vertical moving bed. The column walls are perforated or screened and the ice-brine slurry is pumped into the bottom of the column and flows upward. The brine is removed by filtration through one performations. The remaining bed of ice crystals is pushed vertically upward through the column by hydraulic forces and is washed free of any entrapped brine by a continuous countercurrent stream of fresh water applied to the top of the ice pack. The purified ice is continuously harvested at the top of the column by scrapping. This ice-washer was introduced by Dr. Wiegandt of Cornell University and has since been successfully tested by Colt Industries and Carrier Corp. Other washing means such as centrifuging may also be used.

C. CONDENSATION OF THE LOW PRESSURE WATER VAPOR

It has been described that vapor obtained in the vaccum flash ice-making operation can not be condensed into pure liquid water unless the vapor is compressed to a pressure higher than the triple point pressure. No such gas compression is made in the processes of the present invention. Therefore, the water has to be condensed either by desublimation to form ice or by absorption into an aqueous solution. It has also been described that the heat of condensation is to be utilized in the high pressure ice-melting operation to be described in detail under heading (d). Ice-water slurry to be melted is under pressure and is confined within a high pressure enclosure such as high-schedule steel pipes. Water vapor is condensed at the outer surface of the pipes or tubes and the heat is transfered to the ice-water slurry inside the pipe. In desublimation operation, continual build up of ice on heat transfer surface will detard heat transfer. Therefore, some means have to be provided to avoid ice build-up on the surface. There are two ways: i. by mechanical scraping of heat transfer surface, and ii. by having a liquid film covering the heat transfer area so that ice is formed at the surface of the liquid film or within the liquid film but not on the metal heat transfer surface. These desublimation operations together with the absorption operations are discussed as follows:

I. DESUBLIMATION WITH MECHANICAL SCRAPING

FIG. 4–a illustrates desublimation operation with mechanical scraping. Ice formed on the heat transfer surface is scraped off by travelling scrapers. We may also use a flexible metal film covering the high pressure pipes and shake the outside flexible metal film intermittently to remove the ice formed on it. It is preferable to collect the ice formed by the desublimation operation separately rather to admix it with the ice-brine slurry. The ice collecting device is not shown in the figure. The ice obtained in this desublimation operation is also to be slurrified and melted under high pressure in the way the purified ice is processed. This operation is not shown in FIG. 1.

The rate of heat transfer is likely to be governed by the added resistance due to the ice deposited on the heat transfer surface. However, when ice is mechanically removed intermittently, this added resistance is not excessive. The thermal conductivity of ice is $5.7 \times 10^{-3}$ gr-cal/(sec)(cm$^2$)(°C/cm) or 1.4 Btu/(hr)(ft$^2$)(°F/ft). The resistance imposed by an ice layer of 1 mm thick is calculated to correspond to a film having a heat transfer coefficient of 420 Btu/(hr)(ft$^2$)(°F/st$^2$). It probably takes half an hour to build up to 1 mm thick. Therefore, if mechanical scraping is done frequently enough, the added resistance due to the ice-deposit is not excessive.

II. DESUBLIMATION ONTO AN IMMISCIBLE LIQUID FILM

FIG. 4–b shows that a heat exchange medium (denoted as H. E. M.) liquid flows on the heat transfer surface to act as an intermediate layer. Heat of desublimation is transfered to this medium which again transfers it to the metal wall. When the flow is properly adjusted ice build-up on the metal surface can be avoided. Ice is then suspended in the H.E.M. and the suspension is collected in the troughs shown in the figure. The ice so formed is separated from the H. E. M. liquid and melted to yield water. Ice-H.E. M. separating can be easily done by adding water and transfer ice to the water layer. Actually, ice-H.E.M. slurry may be directly pressurized to melt the ice, and the water-H.E.M. mixture is then separated. The heat exchange medium is recycled within the system.

III. CONDENSATION BY ABSORPTION INTO AN AQUEOUS SOLUTION

FIG. 4c shows that an aqueous solution flows on the surface of metal walls to absorb the low pressure water vapor and transfers heat to the metal walls. The heat is then transferred to the inside of the pipes and utilized in the ice-melting operation.

Equilibrium vapor pressure of an aqueous solution is a function of temperature and composition. An aqueous solution either absorbs or desorbs water vapor depending on whether the water vapor surrounding the solution has a vapor pressure higher or lower than the equilibrium vapor pressure of the solution at the temperature. Conversely, a water vapor of a given vapor pressure is absorbed into an aqueous solution at a temperature when the absorbing solution is more concentrated than the saturated solution as read from FIG. 2 at the given temperature and pressure. For example, in order to absorb water vapor at 4 mm Hg, at 29°F, 29.2°F, 29.4°F 29.6°F and 29.9°F, the minimum concentrations of the absorbing solutions are respectively 3 percent, 4 percent, 5 percent, 6 percent and 7 percent. It is thus seen that the concentration of the absorbing solution depends greatly on the absorbing temperature.

The absorbing solution to be used in the present process has to come ultimately from other sources. For example, this process may be used in combination with a distillation process. This process is first used to concentrate sea water to say 5 percent and the discharge solution is then concentrated by the distillation process to 7 percent. The concentrated (7 percent) solution is then recycled back to the freezing process to be used the absorbing solution. Another example is to use sea water as the absorbing solution in the processing of brackish water. In the practical application of this process, it is not economically feasible to use a highly concentrated solution for the absorption operation. Such is the case is shown by the failure of the freezing by absorption and desorption process once studied by Carrier Corp. Therefore, in the present process, we use a low concentration absorbing solution by conducting the gas absorption at a low temperature. There is a lower limit to this temperature, however, due to the ice-formation along OA line in FIG. 2. The absorbing temperature has to be higher than the temperature on the OA line in FIG. 2 and corresponding to the vapor pressure of the water vapor. For example, the absorbing temperature has to be higher than 29°F for a water vapor at 4.0 mm Hg.

As has been described, the heat of absorption is to be used in the ice-melting operation and the melting point lowering is to be attained by the application of pressure. When the absorption temperature is low, the melting point has to be even lower and the pressure required to attain such a low melting point has to be high. Therefore, there is an optimization problem of selecting an operable set of condition for the concentration of the absorbing solution, absorbing temperature, melting temperature and the applied pressure which gives the overall water production cost a minimum.

D. HIGH PRESSURE ICE-MELTING OPERATION

As shown by line OC in FIG. 2, the melting point of ice is lowered at the rate of 1°C per 100 atm. increase in the applied pressure. In order to give an overall picture of the process, an example is given as follows: water is flash evaporated and ice is crystallized out from an aqueous solution at prevailing composition of 4.5 percent. The equilibrium vapor pressure is 3.75 mm Hg. Allowing 0.2 mm Hg for the evaporation and the condensation to take place at practical rates, the vapor is condensed either by desublimation or by absorption at 26.25°F. When a absorption operation is used the concentration of the absorbing solution should be higher than 5.6 percent. It is emphasized that the concentration of the absorbing solution used is rather low. Allowing 1.5°F difference for heat transfer through the metal wall, the melting point of ice should be 24.75°F. The melting point lowering is 32°F − 24.75°F = 7.25°F. And the applied pressure required to attained this melting point lowering is $$100 \times (7.25/1 \times 1.8) = 400 \text{ atm.}$$

This shows the order of magnitude of the applied pressure required in desalting sea water. This example is given for the purpose of illustration and should not be considered in any way to be limitative of the present process. To some people, this pressure may seem too high for the process to be practicable. Actually, there is no technical difficulties involved, since the pressurization operation is applied to a condensed stream, viz. ice-water slurry and the temperature is rather low. With a safety factor of 3, 1 inch schedule-160 pipe can be used for confining the slurry in the ice-melting operation. Furthermore, a very efficient energy exchange scheme, called a flow-work exchanger has recently been developed. This scheme is only applicable to condensed fluids and be used successfully in this process. Such an energy recovery system is described under the heading (f).

For the desalination of a brackish water, the pressure required is much lower than the pressure that has been quoted.

E. HEAT EXCHANGE RELATION BETWEEN VAPOR CONDENSATION OPERATION AND ICE-MELTING OPERATION

As has been described, ice-water slurry is pressurized and confined within a high pressure enclosure such as steel pipes. Vapor condensation takes place at one side (say outside) of the metal wall and ice-melting takes place at the other side (say inside). Heat is transfered through the metal wall.

F. ENERGY EXCHANGE RELATION BETWEEN PRESSURIZATION AND DEPRESSURIZATION OPERATIONS

As has been described, an ice-water slurry has to be pressurized to lower its melting temperature and the product water has to be depressurized. The ice-water slurry may be pressurized by a high pressure pump and the product water may be depressurized through a turbine. Work recovered in the turbine can be utilized in the pumping operation. Such an operation is not very efficient. The so-called "flow-work exchanger" introduced by the present inventors can be applied to this process to improve the energy recovery and to reduce equipment cost.

FIG. 9. illustrates a flow work exchanger in connection with a multistage freezing process of the present invention. In the high pressure ice-melting operation, the volume of the stream shrinkes as ice is melted. Therefore, the volume to be depressurized is less than the volume to be pressurized by about 10 percent of the volume of the ice melted. Since, a flow-work exchanger exchanges energy between two condensed fluids of equivalent volumes, the excess part of the feed has to be pressurized by a high pressure pump. Therefore, for the net production of 1,000 gallons water, 900 gallons can be pressurized by a flow-work exchanger and only 100 gallons has to be pressurized by a high pressure pump.

Refering to the figure, a flow-work exchanger consists of one or more displacement vessels (two as shown in the FIG.), check valves ( $V_1$, $V_2$, $V_3$, and $V_4$ ), control valves ( $V_5$, $V_6$, $V_7$, and $V_8$ ), a low-pressure low head pump ($J_1$), and a high-pressure low head pump ($J_2$). The pump $J_2$ is used to recover the pressure drop of fluid during its passage through the processing system and maintains ($P_H)_2$ higher than $(P_H)_1$ by an amount sufficient to carry out a high-pressure displacement operation to be described. Alternately, the pump $J_2$ may be installed at the inlet side of the high-pressure system such as location Y in FIG. 9. The pump $J_1$ is used to maintain ($P_L)_1$ somewhat higher than ($P_L)_2$ to carry out a low-pressure displacement operation to be described. The high-pressure pump ($J_3$) is used to pressurize the excess part of the feed. The feed end and product end of a displacement vessel will be called a end and b end, respectively.

Each displacement vessel is operated cyclically in the following steps.

Step 1. Substantially nonflow depressurization. The displacement vessel $O_1$ is filled with the high-pressure product. By closing the valve $V_5$ and opening the valve $V_6$, the content in the displacement vessel is depressurized and some product fluid in the amount corresponding to the volume expansion due to the depressurization flows out of the vessel through valve $V_6$. This operation takes a very short time. The check valves $V_1$ and $V_2$ are in the closed position during this operation.

Step 2: Low-pressure displacement operation. When the pressure in the vessel drops below $(P_L)_1$, the check valve $V_2$ opens and the low-pressure feed flows in through $V_2$ and the depressurized product flows out of the vessel through the valve $V_6$. The solid partitioner $M_1$ moves from the a end to the b end. The valves $V_1$ and $V_5$ are kept closed. At the end of this operation the vessel is filled with low-pressure feed.

Step 3: Substantially nonflow pressurization. The displacement vessel $O_2$ is now filled with the low-pressure feed. With the valve $V_8$ closed and the valve $V_7$ open, some high-pressure product flows into the vessel to pressurized the content. This operation takes a very short time, because only a small amount of fluid sufficient to compensate for the volume shrinkage has to be introduced. During this operation the check valves $V_3$ and $V_4$ are in the closed position.

Step 4: High-pressure displacement operation. When the pressure in the vessel exceeds ($P_H)_1$, the valve $V_3$ opens and the high-pressure product flows continually into the vessel through $V_3$ and the pressurized feed fluid is displaced into the high-pressure processing system. The solid partitioner $M_2$ moves from the b end to the a end. At the end of this operation the vessel is filled with high-pressure product. Then, it returns to step 1 and starts over again.

The displacement operations, steps 2 and 4, occupy most of the time in an operating cycle and each nonflow process, step 1 or step 3, takes rather short periods of time. Thus when two displacement vessels are operated with proper timing, fluid flow through the processing system will be continuous except for the short periods during step 1 and step 3 and the time taken in operating the valves. These disturbances may be lessened by accommodating a small accumulator in the system.

It may be noted that a three-way valve may be used to replace a pair of two-way valves, either $V_5$ and $V_6$ or $V_7$ and $V_8$. Furthermore a four-way valve may be used to replace the four valves. $V_5$ through $V_8$.

II. ICE-MAKING BY A VACCUM FLASHING EVAPORATION AND A HIGH PRESSURE COUPLED ICE-MELTING BY A DIRECT CONTACT HEAT TRANSFER

The characteristic feature of this process is that a heat exchange medium of a proper melting point is used as an auxiliary system and is recycled within the system to absorb the heat of desublimation under a vaccum by melting the medium and to supply the heat of ice melting by solidifying the medium under a high pressure and thus regenerates itself. The former operation is refered to as a coupled desublimation operation and is represented by the following relation.

under a vaccum:

Water Vapor → ice        H.E.M. solid → H.E.M. liquid

The latter operation is refered to as a coupled ice-melting operation and is represented by the following relation.

under a high pressure:

Water ← Ice        H.E.M. solid ← H.E.M. liquid

Heat exchanges in these two operations are achieved by direct contact heat transfer.

For the first coupling to take place the melting point of the H.E.M. has to be lower than the desublimation temperature of the water vapor. For the second coupling to take place the freezing temperature (or melting temperature) of the H.E.M. has to be higher than the melting point of ice. Since the desublimation temperature of a water vapor flash evaporated from an aqueous solution with simultaneous ice production is lower than the triple point temperature, the above couplings may seen impossible. The above couplings, however, are possible due to the difference in the effects of applied pressure on melting point of water and the melting point of the H.E.M. Due to the difference, a substance which melts at a temperature lower than the desublimation temperature may melt at a temperature higher than the melting point of water at a sufficiently high pressure.

FIG. 6 shows a flow-sheet of the process belonging to this category. Since most of the operations in this process are similar to those described in connection with the first category, only those operations which are distinct in this category will be described in detail. Refering to FIG. 6, the process consists of the following main operations:

a. ice-making operation by vaccum flash evaporation.
b. ice-washing operation.
c. coupled operation of desublimation and H.E.M. melting.
d. coupled operation of ice-melting and H.E.M. solidification.
e. heat exchange relations in the coupled desublimation operation and the coupled ice-melting operation.
f. energy exchange between pressurization and depressurization operations.

These operations are described as follows:

A. ICE-MAKING OPERATION BY vaccum FLASH EVAPORATION

This operation is similar to the corresponding operation described in connection with category 1. Therefore, the description is not repeated here.

B. ICE-WASHING OPERATION

This operation is also similar to the corresponding operation described in connection with category 1. Therefore, the description is not repeated here.

C. COUPLED OPERATION OF DESUBLIMATION AND H.E.M. MELTING

FIG. 4-d shows that a stream of H.E.M. slurry flows down on the surface of parallel plates. Water vapor flash evaporated from the aqueous solution is contacted with the H.E.M. slurry. The melting point of the H.E.M. is lower than the desublimation temperature of the water vapor. Therefore, water vapor is condensed into solid state while H.E.M. is melted. The ice so formed is suspended in the H.E.M. stream. The mixed stream is collected in the troughs shown in the figure. The parallel plates shown in the figure simply serve the purpose of distributing the H.E.M. and enhance vapor-slurry contact. Any other contact means such as a packed bed can also be used. Refering to FIG. 6, this mixed stream is mixed with purified ice, pressurized and sent to the high pressure ice-melting operation to be described.

The working medium to be employed can be either a pure substance or a mixture of substances. It may have a sharp melting point, such as a eutectic point, or it may have a melting point range. It will be desirable to select a mixture whose melting point range approximates closely the range of the freezing point of the aqueous solution during the freezing operation.

An ideal working medium should have the following qualities: a proper melting range, a very low solubility in water, a large value for the latent heat of fusion, a low $(dP/dT)_{elting}$ value, nontoxicity, cheapness and ready availability. Theoretically, any substance which has a proper melting point (or melting range) and has low solubility in water can be used to form a cyclic auxiliary system to render heat reuse possible. But the problem of economy will probably limit the practical working medium to a hydrocarbon or a mixture of hydrocarbons Phase diagrams (solid-liquid equilibrium) for binary systems of saturated hydrocarbons have been reported by R. Salzgeber (Compt. rend, 240, 1642–1644 (1955)). It is reported that alkanes of $C_{12}$–$C_{13}$, $C_{13}$–$C_{14}$, and $C_{14}$–$C_{15}$ form continuous solid solutions, complicated with transformations at even C ends. FIG. 7 shows the phase diagram of the n-tridecane-n-tetradecane system. It can be seen that a mixture of tridecane and tetradecane of proper composition (say 40 to 60 percent tetradecane) meets the required melting range. One can obtain the linear paraffins readily by urea extraction or molecular sieves from many petroleum stocks. The latent heat of fusion of higher n-paraffin hydrocarbons is particularly high, around 50 to 60 cal./g. for even C-number hydrocarbons and around 40 cal./g. for odd C-number hydrocarbons. The weight of hydrocarbons required to absorb the heat of crystallizing 1 lb. of water is thus 1.3 to 2 lb.

Working medium may be made from alkylnaphthalenes. A partial list of promising alkylnaphthalenes is given in Table 1 with the pertinent physical properties. Since the density of an alkylnaphthalene is so close to that of an aqueous solution, an elaborate equipment may be required for its separation.

TABLE 1

Promising Alkylnaphthalenes for Working Medium

| Name | M.P. (°C) | Density |
|---|---|---|
| 1,2 dimethylnaphthalene | −1 | 1.013 |
| 1,n- octylnathalene | −2 | 0.9427 |
| 2-n- propylnaphthalene | −3 | 0.9770 |
| 2-n-dimethylnaphthalene | −3 | 0.9479 |
| 2-n-pentylnaphthalene | −4 | 0.9561 |
| 1,3-dimethylnaphthalene | −4 | 1.0063 |
| 2-n-butylnaphthalene | −5 | 0.9659 |

D. COUPLED OPERATION OF ICE-MELTING AND H.E.M. SOLIDIFICATION

Refering to FIG. 6, the H.E.M. liquid obtained in the coupled desublimation operation is mixed with purified ice and sent to this high pressure coupled phase transformation operation. The high pressure phase transformation takes place according to the following equation.

Ice + H.E.M. liquid → Fresh water + H.E.M. solid

As has been described the H.E.M. used has a melting point lower than the desublimation temperature of the water vapor obtained in the vaccum flashing operation which again is lower than the melting point of ice at the low pressure condition. Under the high pressure condition, however, the melting point of H.E.M. is sufficiently increased and the melting point of ice is sufficiently lowered that the melting point of H.E.M. becomes higher than the melting point of ice. This reversal in the order of melting points will be refered to as the inversion of the order of melting points due to the applied pressure. It is due to this inversion in the order of melting point that the above phase transformation becomes possible.

The melting point of an ordinary organic substance is raised by about 2°C and the melting point of ice is lowered by about 1°C due to the increase in applied pressure by 100 atm. Therefore the total approach in the melting points is about 3°C per 100 atm.. Refering to the example given in connection with the first category the applied pressure required is

$$100 \times (7.25/3 \times 1.8) = 133 \text{ atm.}$$

The product stream from the ice-melter is separated into a fresh water stream and a H.E.M. slurry by the high pressure separator shown in FIG. 6. These streams are depressurized separately. The fresh water stream is heat exchanged with feed brine before being discharged and the H.E.M. slurry is recycled to the coupled desublimation operation.

E. HEAT EXCHANGE RELATIONS IN THE COUPLED DESUBLIMATION OPERATION AND THE COUPLED ICE-MELTING OPERATIONS

These heat exchanges are by direct contact heat transfer operations and have already been described under headings (c) and (d) above.

F. ENERGY EXCHANGES BETWEEN PRESSURIZATION AND DEPRESSURIZATION OPERATIONS

We have to use two sets of flow-work exchangers. One set is used to exchange energy in the depressurization of fresh water and the other set is used to exchange energy in the de-pressurization of H.E.M. slurry. The operation of a flow-work exchanger has already been described in the corresponding section under category 1.

III. LOW PRESSURE ICE-MAKING BY DIRECT CONTACT HEAT TRANSFER AND HIGH PRESSURE SIMPLE ICE-MELTING BY AN INDIRECT CONTACT HEAT TRANSFER

In this process, ice-making is accomplished by direct contact cooling by a heat exchange medium and ice-melting is accomplished by indirect contact heat transfer from the heat exchange medium. The ice-melter is maintained at a sufficiently high pressure so that the temperature prevailing in the ice-maker is higher than the temperature prevailing in the ice-melter. Refering to FIG. 8-a, a heat exchange medium is circulated between the ice-maker and the ice-melter. In the ice-maker, the H.E.M. picks up heat of crystallization either as sensible heat or latent heat and in the ice-melter, the H.E.M. gives out heat to the metal wall and consequently melt the ice. The slurry leaving the ice-maker is separated into a H.E.M. stream and a ice-brine slurry. The ice-brine slurry is separated into ice and reject brine. The purified ice is slurrified either with water or an insoluble oil and is pressurized and sent into the ice-melter. The H.E.M. stream separated in the separator is then circulated to the ice melter. FIG. 8b shows a combined ice-maker and ice melter with built-in separators. The operation is similar to that shown in FIG. 8a Energy exchange can be obtained between the depressurization and pressurization by a flow-work exchanger.

A MULTISTAGE OPERATION AND A MULTIEFFECT MULTISTAGE OPERATION

Any process of the present invention is particularly adaptable to a multistage or even a multieffect multistage operation. This gives a great advantage to the processes of the present invention. From the thermodynamic point of view, a single stage back-mixed type operation is the least efficient and a countercurrent plug-flow type operation is the most efficient. For a back-mixed type converter, a multistage operation always gives a better thermodynamic efficiency. Some processes are not adaptable to multistage operations, because plant cost and/or operational difficulty increase greatly as the number of stages increases. Some processes are particularly adaptable to multistage operations, because plant cost does not increase or even decreases as the number of stage increases. Most of the conventional freezing processes belong to the former type, and the processes of the present invention belong to the latter type. Recently, a multistage flash distillation process (SEMS process) and a multieffect multistage flash distillation process (MEMS process) have been introduced in the desalination field. They have demonstrated great economical advantage of a multistage operation.

FIG. 5a illustrates a multistage ( 14 as shown ) freezing process and FIG. 5b illustrates a multieffect multistage ( 3 effects, five stages per effect ) freezing process.

Refering to FIG. 5a, a brine feed enters at the first stage and flows through the successive stages before it is discharged from the last stage. In each stage, more water evaporates and more ice freezes from the brine prevailing in the stage. Therefore, the concentration of the brine prevailing in each stage increases successively and the temperature and the pressure decrease successively. Consequently the condensing ( desublimation and absorption ) temperature also decreases successively. When a single effect operation is used, the ice-water slurry is pressurized to a high pressure. Therefore, the melting point is essentially constant throughout the stages. Consequently, $\Delta t$ for heat transfer in the ice-melting operation is greater in the earlier stages than in the later stages. There is a problem of allocating heat transfer area, allocating size of ice-maker in each stages. At any rate, the performance at the earlier stages are better than the latter stages. In a single stage operation, the performance corresponds to that of the last stage.

Refering to FIG. 5b, ice-water slurry is split up into several streams. A stream to be introduced into earlier stages is pressurized to a lower pressure than another stream to be introduced to the later stages. In this way power consumption can be reduced.

It will be noticed from these figures that they resemble a multistage flash distillation process and a multieffect multistage flash distillation process very closely. And the economical advantages obtained in these multistage distillation processes should be obtainable in these multistage freezing processes

THE ADVANTAGES OF THE PROCESSES

The advantages of these processes are summarized as follows:
1. Plant cost is low, because i. steel pipe can be used for the heat transfer area, ii. multistage operation can be used, iii. flowwork exchangers can be used.
2. Power cost is low, because i. flow-work exchangers can be used and ii. a multistage operation can be applied.

The embodiments of the invention in which an exclusive property or previledge is claimed are defined as follows:

1. A process of effecting rectification of an aqueous solution into relatively rich and lean portions by a first step of partially freezing the aqueous solution by removal of heat energy therefrom to form an ice slurry, a second step of separating the ice from the mother liquor, and a third step of melting the separated ice by the addition of heat energy so that the mother liquor and the melted ice respectively constitute the relatively rich and lean portions; characterized by
   1. conducting the first step by flash vaporizing water from the aqueous solution under a vaccum to simultaneously produce an ice slurry and a low pressure water vapor, and
   2. conducting the third step by maintaining an indirect contact heat exchange relation between the said low pressure water vapor and the said separated ice through a heat conducting wall while maintaining the water vapor under a pressure lower than the triple-point vapor pressure of pure water, 4.6 mm $H_g$, and maintaining the ice under a sufficiently high pressure such that the melting temperature of the ice under the said high pressure be lower than the temperature at which the said low pressure water vapor undergoes transformation to solid ice to simultaneously melt the separated ice and transform the low pressure water vapor into solid ice.

2. The process of claim 1, wherein the heat conducting wall which is used to separate the low pressure water vapor from the separated ice during their indirect contact heat exchange is wetted by an organic liquid stream to carry away the solid ice which is converted from the low pressure water vapor.

3. The process of claim 1, wherein the solid ice deposited on the heat conducting wall which is used to separate the low pressure water vapor from the separated ice during their indirect contact heat exchange is mechanically scraped off.

4. The process of claim 1, wherein the solid ice deposited on the heat conducting wall through which the low pressure water vapor and the separated ice are in indirect heat exchange relation is removed from the wall occasionally.

5. A process of effecting rectification of an aqueous solution into relatively rich and lean portions by a first step of partially freezing the aqueous solution by removal of heat energy therefrom to form an ice slurry, a second step of separating the ice from the mother liquor, and a third step of melting the separated ice by the addition of heat energy so that the mother liquor and melted ice respectively constitute the relatively rich and lean portions; characterized by 1. conducting the first step by flash vaporizing water from the aqueous solution under a vaccum to thereby simultaneously produce an ice slurry and a low pressure water vapor, and 2. conducting the third step by bringing an aqueous solution into direct contact with the said low pressure water vapor and also into an indirect contact heat exchange relation with the said separated ice, while maintaining the low pressure water vapor under a pressure lower than the triple-point vapor pressure of pure water, 4.6 mm $H_g$, and maintaining the said separated ice under a high pressure such that the melting temperature of the ice is lower than the temperature at which the low pressure water vapor is absorbed into the aqueous solution, to thereby simultaneously absorb the water vapor into the said aqueous solution and melt the separated ice.

6. A process of effecting rectification of an aqueous solution into relatively rich and lean portions by a first step of partially freezing the aqueous solution by removal of heat energy therefrom to form an ice slurry, a second step of separating the ice from the mother liquor, and a third step of melting the separated ice by the addition of heat energy so that the mother liquor and the melted ice respectively constitute the relatively rich and lean portions; characterized by 1. conducting the first step by flash vaporizing water from the aqueous solution under a vaccum to simultaneously produce an ice slurry and a low pressure water vapor, and 2. bringing the low pressure water vapor into heat exchange relation with a heat exchange medium which is at least partly in solid state, while maintaining the water vapor under a pressure lower than the triple-point pressure of pure water, 4.6 mm $H_g$, to simultaneously convert the water vapor into solid ice and at least partially melt the heat exchange medium.

* * * * *